United States Patent [19]

Kugele et al.

[11] Patent Number: 4,665,114

[45] Date of Patent: May 12, 1987

[54] STABILIZER COMPOSITIONS AND POLYMERS CONTAINING SAME

[75] Inventors: Thomas G. Kugele; Keith A. Mesch; Karl R. Wursthorn, all of Cincinnati, Ohio

[73] Assignee: Morton Thiokol Inc., Chicago, Ill.

[21] Appl. No.: 569,545

[22] Filed: Jan. 10, 1984

Related U.S. Application Data

[63] Continuation of Ser. No. 345,821, Feb. 4, 1982, abandoned, which is a continuation-in-part of Ser. No. 238,299, Feb. 26, 1981, Pat. No. 4,360,619.

[51] Int. Cl.$^4$ .............................................. C08K 5/58
[52] U.S. Cl. .................................. 524/181; 252/400.1; 524/180; 524/302; 524/305; 524/289
[58] Field of Search ............... 524/180, 181, 330, 331, 524/333, 324; 252/400 K, 404, 400.1

[56] References Cited

U.S. PATENT DOCUMENTS

| | | | |
|---|---|---|---|
| 2,707,178 | 4/1955 | Wilson | 260/45.5 |
| 2,954,362 | 9/1960 | Wilson | 260/45.75 |
| 3,063,963 | 11/1962 | Wooten et al. | 524/180 |
| 3,067,166 | 12/1962 | Zaremsky | 260/45.75 |
| 3,103,500 | 9/1963 | Tholstrup et al. | 524/330 |
| 3,167,527 | 1/1965 | Hechenbleikner et al. | 524/181 |
| 3,412,122 | 11/1968 | Considine et al. | 524/181 |
| 3,417,039 | 12/1968 | Penneck | 260/23 |
| 3,440,255 | 4/1969 | Matsuda et al. | 524/181 |
| 3,503,241 | 3/1970 | Pollock | 524/180 |
| 3,503,924 | 3/1970 | Pollock et al. | 260/45.75 |
| 3,507,827 | 4/1970 | Pollock | 524/180 |
| 3,542,825 | 11/1970 | Hoye | 524/180 |
| 3,630,992 | 12/1971 | Brecker | 260/45.75 K |
| 3,674,371 | 7/1972 | Brecker et al. | 524/180 |
| 3,715,333 | 2/1973 | Larkin | 260/45.75 R |
| 3,758,341 | 9/1973 | Wowk | 524/181 |
| 3,758,536 | 9/1973 | Wowk | 524/180 |
| 3,758,537 | 9/1973 | Wowk | 524/181 |
| 3,887,519 | 6/1975 | Weisfeld et al. | 260/45.75 K |
| 3,890,277 | 6/1975 | Kugele et al. | 524/180 |
| 3,928,285 | 12/1975 | Gough et al. | 524/180 |
| 3,933,680 | 1/1976 | Wowk | 524/180 |
| 3,943,099 | 3/1976 | Bakassian | 260/45.75 E |
| 3,970,678 | 7/1976 | Molt | 260/429.7 |
| 3,979,359 | 9/1976 | Kugele et al. | 260/45.75 S |
| 4,062,881 | 12/1977 | Kugele | 260/399 |
| 4,111,903 | 9/1978 | Hoch et al. | 524/180 |
| 4,118,371 | 10/1978 | Kugele | 260/45.75 S |
| 4,254,017 | 3/1981 | Dworkin | 524/180 |
| 4,360,619 | 11/1982 | Kugele | 524/305 |
| 4,576,984 | 3/1986 | Bresser et al. | 524/181 |

FOREIGN PATENT DOCUMENTS

| | | |
|---|---|---|
| 2434835 | 3/1980 | France . |
| 2286 | 3/1960 | Japan . |
| 16435 | 10/1962 | Japan . |
| 18213 | 5/1972 | Japan . |
| 160044 | 12/1980 | Japan . |
| 2336 | 1/1981 | Japan . |
| 771857 | 4/1957 | United Kingdom . |
| 874574 | 8/1961 | United Kingdom . |
| 991763 | 5/1965 | United Kingdom . |
| 1001344 | 8/1965 | United Kingdom . |
| 1117652 | 6/1968 | United Kingdom . |
| 1321157 | 6/1973 | United Kingdom . |
| 1349913 | 4/1974 | United Kingdom . |

OTHER PUBLICATIONS

Chevassus et al: The Stabilization of Polyvinyl Chloride–(1963), 56–73, St. Martin's Press, Inc., N.Y.

Klemchuck, "Poly(vinyl chloride) Stabilization Mechanisms," ACS Advances in Chemistry Series, 85, 1, 1968.

Starnes et al, "Chemical Stabilization of Poly(vinyl chloride) by Prior Reaction with Di(n-butyl)tin bis(n-dodecyl mercaptide)," Macromolecules, vol. 9, No. 4, p. 633 (Jul.-Aug., 1976).

Parker et al, "The Ligand Exchange Reaction of Some Dialkyltin Dimercaptides and Dicarboxylates with Dialkyltin Dichlorides," ACS Advances in Chemistry Series, 169, 363–373 (1978).

Wirth et al, "The Effect of Organotin Chlorides on the Thermal Stability of PVC," Journal of Vinyl Technology, vol. 1, No. 1, pp. 51–54 (Mar. 1979).

Bellinger et al, "Stabilization of Poly(vinyl chloride) by Dibutyltin Thioglycolate—Part I: Structure and Composition Changes Which Occur During Processing," Polymer Degradation and Stability, 3, pp. 3–12 (1980–1981).

Burley et al, "A Possible Mechanism to Explain the Synergistic Effects Exhibited by Mixtures of Alkyltin Mercaptoesters as Stabilizers for PVC," Polymer Degradation and Stability, 3, pp. 285–294 (1980–1981).

*Primary Examiner*—Veronica P. Hoke
*Attorney, Agent, or Firm*—Richard J. Sheridan; Gerald K. White

[57] ABSTRACT

This invention relates to stabilizer compositions for polymers comprising (1) an organotin compound, or mixture of organotin compounds, (2) a mercaptan-containing organic compound or mixture of mercaptan-containing organic compounds, and, optionally, (3) a halogen-containing tin compound or mixture of halogen-containing tin compounds, said stabilizers having a total halogen content of about 0.1% to about 10% by weight based on the weight of the stabilizer composition. This invention also relates to polymer compositions containing said stabilizers, to a process for stabilizing polymer by adding thereto said stabilizers, and to articles of manufacture, e.g. pipe, comprising a polymer and said stabilizers.

3 Claims, No Drawings

STABILIZER COMPOSITIONS AND POLYMERS CONTAINING SAME

This application is a continuation of application Ser. No. 345,821, filed Feb. 4, 1982 now abandoned which is in turn a continuation-in-part of Ser. No. 238,299, filed Feb. 26, 1981 now U.S. Pat. No. 4,360,619.

FIELD OF THE INVENTION

This invention relates to stabilizer compositions containing an organotin compound or mixture of organotin compounds, a mercaptan-containing organic compound or mixture of mercaptan-containing organic compounds, and, optionally, a halogen-containing tin compound or mixture of halogen-containing tin compounds. This invention also relates to polymer compositions containing said stabilizer compositions, to methods for stabilizing polymers by adding thereto said stabilizer compositions and to articles of manufacture, e.g. pipe, made from polymers stabilized with said stabilizer compositions.

BACKGROUND OF THE INVENTION

Organotin compounds, particularly useful as stabilizers, for halogen containing polymers, are well known in the art. These organotin compounds can provide stabilization of such polymers when used alone or in combination with various compounds. For example, U.S. Pat. No. 3,715,333 to W. A. Larkin discloses stabilizers for halogen containing polymers which contain, as a first stabilizer, an organotin halide having the formula:

where R is a hydrocarbon and X is chlorine, bromine, or iodine; and, as a second stabilizer, a sulfur-containing organotin compound exhibiting two direct carbon to tin bonds and a direct bond from tin to each of two sulfur atoms. Likewise, U.S. Pat. No. 3,503,924 to M. W. Pollock discloses stabilizers for polyvinyl chloride resins which are mixtures containing a diorganotin mercaptide and a minor amount of an alpha-mercapto acid. Pollock also discloses, in U.S. Pat. No. 3,507,827, stabilizer combinations for decreasing early discoloration of polyvinyl chloride resins which contain (1) a dialkyl, dicycloalkyl or alkylcycloalkyl tin mercapto carboxylic acid ester, and (2) an alpha- or beta-mercapto acid having at least three carbon atoms, or an alpha- or beta-mercapto alcohol having at least two carbon atoms.

SUMMARY OF THE INVENTION

In accordance with this invention there are provided compositions for stabilizing halogen-containing organic polymers which comprise an organotin compound or mixture of organotin compounds, a mercaptan-containing organic compound or mixture of mercaptan-containing organic compounds, and, optionally, a halogen-containing tin compound or mixture of halogen-containing tin compounds. The invention is also directed to polymer compositions containing a stabilizing composition comprising an organotin compound or mixture of organotin compounds, a mercaptan-containing organic compound or mixture of mercaptan-containing organic compounds, and, optionally, a halogen-containing tin compound or mixture of halogen-containing tin compounds; to a process for stabilizing polymers by adding thereto a stabilizing composition comprising an organotin compound or mixture of organotin compounds, a mercaptan-containing organic compound or mixture of mercaptan containing organic compounds, and, optionally, a halogen-containing tin compound or mixture of halogen-containing tin compounds; and to articles of manufacture, e.g. pipe, made from polymers stabilized with a stabilizing composition comprising an organotin compound or mixture of organotin compounds, a mercaptan-containing organic compound or mixture of mercaptan-containing compounds, and, optionally, a halogen-containing tin compound or mixture of halogen containing tin compounds.

DETAILED DESCRIPTION

The stabilizer composition of this invention have quite unexpectedly been found to impart stabilization against the deteriorative effects of heat to halogen-containing organic polymers which is superior to those stabilizer compositions previously known in the art.

The term halogen-containing organic polymers as used herein refers to halogen-containing vinyl and vinylidene polymers or resins in which the halogen is attached directly to the carbon atoms. Preferably, the polymer is a vinyl halide polymer, more particularly a vinyl chloride polymer. Usually, the vinyl chloride polymer is made from monomers consisting of vinyl chloride alone or a mixture of monomers comprising, preferably, at least about 70% by weight based on the total monomer weight of vinyl chloride.

The halogen-containing polymers which can be stabilized according to this invention include chlorinated polyethylene having 14 to 75%, e.g. 27%, chloride by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), and vinyl chloride-2-ethylhexyl acrylate (80:20). In addition to the stabilizer compositions of this invention, there can also be incorporated into the halogen-containing organic polymer conventional additives such as plasticizers, pigments, fillers, dyes, ultraviolet light absorbing agents, densifying agents and the like.

The stabilizer compositions of this invention comprise an organotin compound or mixture of organotin compounds, a mercaptan-containing organic compound or mixture of mercaptan-containing organic compounds, and, optionally, a halogen-containing tin compound or mixture of halogen-containing tin compounds. The organotin compounds useful in this invention contain one or more tetravalent tin atoms which each have at least one direct tin to carbon bond and have structures selected from the following formulas:

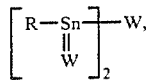 (I)

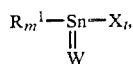 (II)

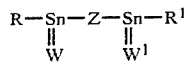 (IIa)

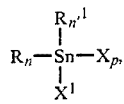 (III)

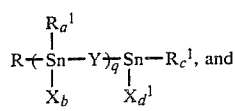 (IV)

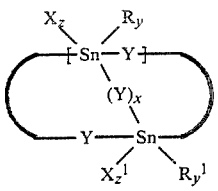 (V)

wherein

X and $X^1$ are the same or different and are selected from $-SR^2$, Cl, Br, I,

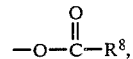

and $O-R^8$ with the proviso that in formula (II) when t=1, in formula (V) when z=1 and in formulas (III) and (IV) at least one X or $X^1$ is $-SR^2$;

Y is $-(S)_{\bar{v}}$, $-W-R^3-W^1-$,

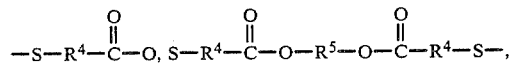

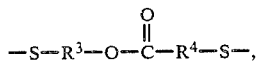

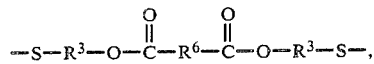

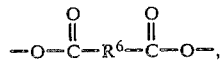

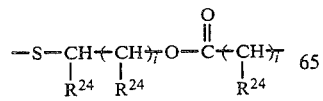

Z is

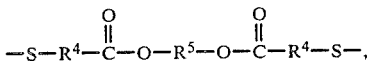

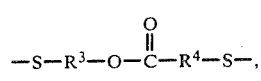

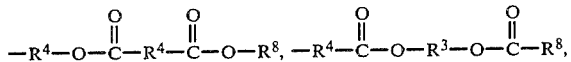

W and $W^1$ are the same or different and are oxygen or sulfur;

R and $R^1$ are the same or different and are selected from alkyl, aryl, alkenyl, aralkyl, alkaryl, cycloalkyl, cycloalkenyl,

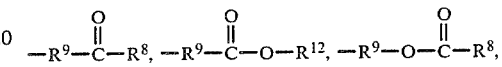

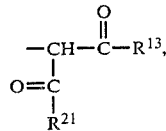

$-R^9-O-R^{12}$, and $-R^9-CN$;

$R^2$ is alkyl, alkenyl, aryl, aralkyl, cycloalkyl, cycloalkenyl,

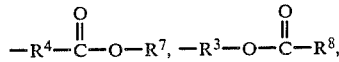

$-R^3-S-R^7$, or $-R^3-O-R^8$;

$R_3$ is alkylene of at least 2 carbon atoms, arylene, alkenylene of at least 2 carbon atoms, cycloalkylene, or cycloalkenylene;

$R^4$ is alkylene, arylene, alkenylene of at least 2 carbon atoms, cycloalkylene, or cycloalkenylene;

$R^5$ is $R^3$;

$R^6$ is nothing or $R^4$;

$R^7$ is $-H$ or $R^8$;

$R^8$ is alkyl, alkenyl, aryl, aralkyl, alkaryl, cycloalkyl, or cycloalkenyl;

$R^9$ is $C_1$ to $C_4$ alkylene;

$R^{12}$ is $-H$ or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

$R^{24}$ is

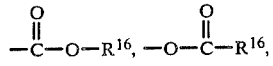

$-OH$, $-SH$, aryl, $C_1$ to $C_{18}$ alkyl or $-H$;

$R^{16}$ is $-H$ or $R^8$;

i=0 or an integer from 1 to 6 inclusive;

m=1 or 2 and t=0 or 1 with the proviso with m+t=2;

n=0, 1 or 2, n'=0, 1 and p=1 or 2 with the proviso that n+n'=1 or 2 and n+n'+p=3;

a=0, 1 or 2, b=0, 1 or 2, q=an integer from 1 to 5 inclusive c=1, 2 or 3 and d=0, 1 or 2 with the proviso that a+b=2 and c+d=3;

v=an integer from 1 to 8 inclusive; and w=0, 1 or 2, x=0 or 1, y=1 or 2, z=0 or 1 with the proviso that when x=0 and w=1 or 2 then y=1 and z=1, when x=1 then y=1, z=0 and w=1, when w=2 then x=0, y=1 and z=1 and when w=0 then x=0, y=1, z=1 and Y is $-W-R^3-W^1-$ or $$-S-R^4-\overset{O}{\underset{\|}{C}}-O.$$

As used herein the term alkyl represents monovalent straight or branched chain hydrocarbon radicals containing, for example, 1 to 20 carbon atoms. The term aryl refers to monovalent $C_6-C_{10}$ aromatic rings such as benzene and naphthalene. The term alkenyl refers to monovalent straight or branched chain $C_2$ to $C_{20}$ hydrocarbon radicals containing at least one double bond. The term aralkyl represents a monovalent $C_1$ to $C_{20}$ hydrocarbon radical having attached thereto an aryl radical. The term alkaryl refers to monovalent aryl radicals having attached thereto at least one $C_1-C_{20}$ alkyl radical. The term cycloalkyl represents monovalent $C_3-C_8$ saturated cycloaliphatic radicals, and the term cycloalkenyl represents $C_5-C_8$ cycloaliphatic radicals containing at least one double bond.

The organotin compounds useful in this invention are prepared by methods well known in the art. For example, methods of preparing those organotin compounds are disclosed in U.S. Pat. Nos. 3,565,930, 3,869,487, 3,979,359, 4,118,371, 4,134,878 and 4,183,846.

The preferred organotin compounds useful in this invention are those compounds according to formula (I) where R is methyl, butyl or octyl and W is sulfur; those compounds according to formula (II) where $R^1$ is methyl or butyl, W is sulfur, X is $-SR^2$ where $R^2$ is $$-R^3OCR^8,\quad \text{(with } \overset{O}{\underset{\|}{C}}\text{)}$$

m=1 and t=1; those compounds according to formula (IIa) where R and $R^1$ are methyl, butyl, octyl or $$-R^9-\overset{O}{\underset{\|}{C}}-O-R^{12};$$

W and $W^1$ are oxygen or sulfur; and Z is $$-S-R^3-O-\overset{O}{\underset{\|}{C}}-R^6-\overset{O}{\underset{\|}{C}}-O-R^3-S-,$$

$$-S-R^3-O-\overset{O}{\underset{\|}{C}}-R^4-S-\text{ or}$$

$$-S-R^4-\overset{O}{\underset{\|}{C}}-O-R^5-O-\overset{O}{\underset{\|}{C}}-R^4-S-;$$

those compounds according to formula (III) where R is methyl or butyl, $R^1$ is methyl or butyl, X is $-SR^2$ where $R^2$ is $$-R^3OCR^8,\quad \text{(with } \overset{O}{\underset{\|}{C}}\text{)}$$

$X^1$ is $-SR^2$ where $R^2$ is $$-R^3OCR^8,$$

n=0 or 1, n'=0 or 1, n+n'=1 and p=2; those compounds according to formula (IV) where R is methyl, X is $-SR^2$ where $R^2$ is $$-R^3OCR^8,$$

$R^1$ is methyl, $X^1$ is $-SR^2$ where $R^2$ is $$-R^3OCR^8,$$

Y is $-S-$, a=0, b=2, c=1, d=2 and q=1; and those compounds according to formula (V) where R is methyl, $R^1$ is methyl, Y is $-S-$, w=1, x=1, y=1 and z=0.

Examples of organotin compounds which are useful in this invention include, but are not limited to those illustrated in Tables I-IV below. Thus, representative of the organotin compounds described by formulas (I) and (II) are those illustrated in Table I below.

Representative of the organotin compounds described by formula (IIa) are those illustrated in Table Ia below.

Examples of the organotin compounds represented by formula (III) are illustrated in Table II below.

The organotin compounds illustrated in Table III below are representative of compounds described by formula (IV).

The organotin compound illustrated in Table IV below is representative of compounds described by formula (V).

TABLE I

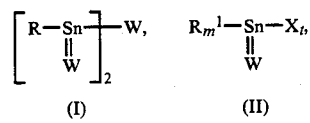

| Organotin Compound No. | R | $R^1$ | W | X | m | t |
|---|---|---|---|---|---|---|
| 1 | $-C_4H_9$ | — | S | — | — | — |
| 2 | $-C_8H_{17}$ | — | O | — | — | — |

TABLE I-continued $$\left[\begin{array}{c}R-Sn-\\ \|\\ W\end{array}\right]_2 W, \quad R_m^1-\underset{\|}{Sn}-X_t,$$
$$\qquad\qquad (I) \qquad\qquad\qquad (II)$$

| Organotin Compound No. | R | R¹ | W | X | m | t |
|---|---|---|---|---|---|---|
| 3 | — | —CH₃ | S | —SCH₂CH₂OC(=O)C₁₇H₃₃ | 1 | 1 |
| 4 | — | —CH₃ | S | —SCH₂C(=O)C₈H₁₇ | 1 | 1 |
| 5 | — | —CH₂CH₂C(=O)OC₄H₉ | S | —SCH₂CH₂OC(=O)C₁₈H₃₇ | 1 | 1 |
| 6 | — | —C₄H₉ | S | — | 2 | 0 |
| 7 | — | —C₈H₁₇ | O | — | 2 | 0 |

TABLE Ia $$R-\underset{\|}{Sn}-Z-\underset{\|}{Sn}-R^1 \qquad (IIa)$$
$$\quad W \qquad W^1$$

| Organotin Compound No. | R and R¹ | W | W¹ | Z |
|---|---|---|---|---|
| 7a | —CH₃ | S | S | —SCH₂CH₂OC(=O)(CH₂)₄C(=O)OCH₂CH₂—S— |
| 7b | —C₄H₉ | S | S | —SCH₂CH₂OC(=O)CH₂CH₂S— |
| 7c | —C₈H₁₇ | O | S | —SCH₂C(=O)OCH₂CH₂OC(=O)CH₂S— |
| 7d | —CH₂CH₂C(=O)OC₄H₉ | S | S | —SCH₂CH₂OC(=O)CH=CHC(=O)OCH₂CH₂S— |
| 7e | —CH₃ | S | S | —SCH₂CH(C₉H₁₉)—OC(=O)CH=CHC(=O)OCH(C₉H₁₉)CH₂S— |
| 7f | —C₄H₉ | S | S | —SCH(OH)C(=O)O(CH₂)₂S— |
| 7g | —C₄H₉ | O | O | —SCH[OC(=O)CH=CHC(=O)CH₃]C(=O)OCH₂CH₂CH₂S— |
| 7h | —CH₃ | S | S | —SCH₂C(=O)CH₂C[(CH₂OH)₂]CH₂OC(=O)CH₂S— |
| 7i | —CH₃ | S | S | —SCH₂C(=O)CH₂C[(CH₂OC(=O)CH₃)₂]CH₂OC(=O)CH₂S— |

TABLE II $$R_n-\underset{\underset{X^1}{|}}{\overset{\overset{R_{n'}^1}{|}}{Sn}}-X_{p'} \quad (III)$$

| Organotin Compound No. | R and R$^1$ | X and X$^1$ | n | n' | p |
|---|---|---|---|---|---|
| 8 | —CH$_3$ | —SCH$_2$COC$_8$H$_{17}$ (C=O) | 1 | 0 | 2 |
| 9 | —C$_4$H$_9$ | —SCH$_2$CH$_2$OCC$_7$H$_{15}$ (C=O) | 1 | 0 | 2 |
| 10 | —CH$_2$CH$_2$COC$_4$H$_9$ (C=O) | —SCH$_2$CH$_2$OCCH$_3$ (C=O) | 2 | 0 | 1 |
| 11 | —CH$_3$ | —SCH$_2$CH$_2$OCC$_{17}$H$_{35}$ (C=O) | 2 | 0 | 1 |

TABLE III $$R+\underset{\underset{X_b}{|}}{\overset{\overset{R_a^1}{|}}{Sn}}-Y\!\!\rightarrow_{\!q}\!\underset{\underset{X_d^1}{|}}{Sn}-R_c^1 \quad (IV)$$

| Organotin Compound No. | R and R$^1$ | X | X$^1$ | Y | a | b | c | d | q |
|---|---|---|---|---|---|---|---|---|---|
| 12 | —CH$_3$ | —SCH$_2$CH$_2$OCC$_{11}$H$_{23}$ (C=O) | Same as X | —S— | 0 | 2 | 1 | 2 | 1 |
| 13 | —C$_8$H$_{17}$ | —SCH$_2$COC$_{13}$H$_{27}$ (C=O) | " | —S— | 1 | 1 | 2 | 1 | 1 |
| 14 | —C$_4$H$_9$ | —SCH$_2$CH$_2$OCC$_8$H$_{17}$ (C=O) | " | —SCH$_2$CH$_2$CO— (C=O) | 1 | 1 | 2 | 1 | 1 |
| 15 | —CH$_2$CH$_2$COC$_4$H$_9$ (C=O) | —SCH$_2$CH$_2$COC$_8$H$_{17}$ (C=O) | " | —S—S— | 0 | 2 | 1 | 2 | 1 |
| 16 | —CH$_3$ | —SCH$_2$CH$_2$OCC$_{17}$H$_{33}$ (C=O) | " | —SCH$_2$COC$_4$H$_8$OCCH$_2$S— (C=O, C=O) | 0 | 2 | 1 | 2 | 2 |
| 17 | —CH$_3$ | —SCH$_2$CH$_2$OCCH=CHCOCH$_3$ (C=O, C=O) | " | —S— | 0 | 2 | 1 | 2 | 1 |
| 18 | —C$_4$H$_9$ | —SCH$_2$CH$_2$OCC$_{17}$H$_{33}$ (C=O) | Cl | —S— | 1 | 1 | 2 | 1 | 1 |
| 19 | —C$_4$H$_9$ | —SCH$_2$CH$_2$OCC$_8$H$_{17}$ (C=O) | Same as X | —S—CH$_2$CO— (C=O) | 0 | 2 | 1 | 2 | 1 |
| 20 | —CH$_3$ | —SCH$_2$CH$_2$OCC$_{11}$H$_{23}$ (C=O) | " | —S— | 0 | 2 | 1 | 2 | 1 |
| 21 | —C$_4$H$_9$ | —SCH$_2$CH$_2$OCC$_7$H$_{15}$ (C=O) | " | —O—C$_6$H$_4$—O— (catechol) | 0 | 2 | 1 | 2 | 1 |

TABLE IV

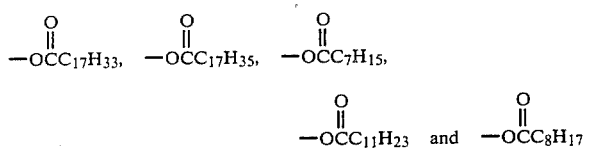

| Organotin Compound No. | R and $R^1$ | X and $X^1$ | Y | w | x | y | z |
|---|---|---|---|---|---|---|---|
| 22 | —$CH_3$ | — | —$SCH_2CH_2OC(=O)$—⌬—$C(=O)OCH_2CH_2S$— | 1 | 1 | 1 | 0 |

As used in Tables I–III above, and throughout this specification, the radicals —$C_4H_9$, —$C_8H_{17}$, —$C_{12}H_{25}$, —$C_9H_{19}$ and —$C_{10}H_{21}$ represent n-butyl, n-octyl, n-dodecyl, n-nonyl and n-decyl respectively.

The carboxyl radicals

—$OC(=O)C_{17}H_{33}$, —$OC(=O)C_{17}H_{35}$, —$OC(=O)C_7H_{15}$,

—$OC(=O)C_{11}H_{23}$ and —$OC(=O)C_8H_{17}$ are derived from oleic acid, stearic acid, n-octanoic acid, lauric acid, and pelargonic acid respectively. Likewise, the radicals —$OC_{13}H_{27}$, —$OC_{18}H_{37}$, and —$OC_8H_{17}$ are derived from tridecanol, stearyl alcohol and iso-octanol respectively.

The mercaptan-containing organic compounds useful in this invention include hydrocarbyl mercaptans, mercapto esters, mercapto alcohols, and mercapto acids. These mercaptan-containing organic compounds have structures illustrated by the following formulas:

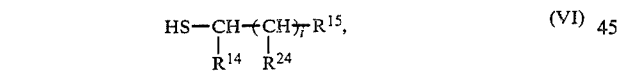  (VI)

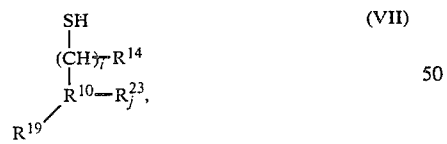  (VII)

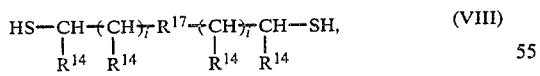  (VIII)

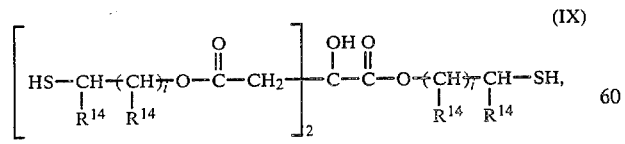  (IX)

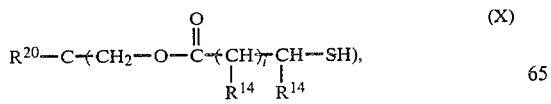  (X)

and

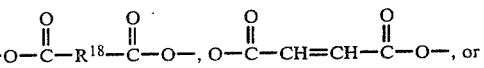  (XI)

where

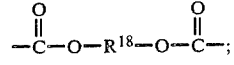  (XIa)

where
$R^{10}$ is cycloalkyl, cycloalkenyl or phenyl;
$R^{14}$ is —H, aryl or $C_1$ to $C_{18}$ alkyl;
$R^{24}$ is as previously defined;
$R^{15}$ is $-\overset{O}{\underset{\|}{C}}-O-R^{16}$, $-O-\overset{O}{\underset{\|}{C}}-R^{16}$, —OH, —SH, aryl, $C_1$ to $C_{18}$ alkyl, or —H;
$R^{16}$ is as previously defined;
$R^{17}$ is $-O-\overset{O}{\underset{\|}{C}}-R^{18}-\overset{O}{\underset{\|}{C}}-O-$, $O-\overset{O}{\underset{\|}{C}}-CH=CH-\overset{O}{\underset{\|}{C}}-O-$, or $-\overset{O}{\underset{\|}{C}}-O-R^{18}-O-\overset{O}{\underset{\|}{C}}-$;

$R^{18}$ is arylene, $C_1$ to $C_8$ alkylene, or

—CH(—$(CH_2)_{\overline{T}}$—S$)_{\overline{T}}$—$(CH_2)_{\overline{T}}$CH—;
with $R^{14}$ substituents $R_{19}$ is —H or a divalent group which may contain halogen, hydroxy, mercapto or alkyl substituents and which combines with $R^{10}$ when $R^{10}$ is phenyl to form a naphthalene ring;
$R^{20}$ is —$CH_3$, —$CH_2CH_3$, or

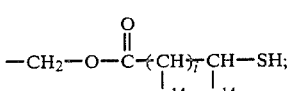

$R^{23}$ is

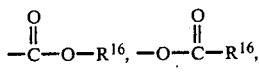

—SH, aryl, $C_1$ to $C_{18}$ alkyl, —OH or —H; with the proviso that in formula (VII) when $R^{10}$ is phenyl, $R^{23}$ is —OH and $i=0$, then the —OH and —SH groups are on non-adjacent carbon atoms;

$R^{200}$ and $R^{201}$ are the same or different and are alkylene, alkenylene, arylene, cycloalkylene or cycloalkenylene; or alkylene, alkenylene, arylene, cycloalkylene or cycloalkenylene each substituted with one or two —R, —$OR^7$, —$R^4$—$OR^7$,

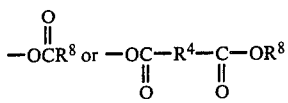

groups;

R, $R^4$, $R^7$ and $R^8$ are as previously defined;

i is as previously defined;

j=0, 1, 2 or 3; and f=1 or 2.

The mercaptan-containing organic compounds useful in this invention are well known compounds (see, for example, U.S. Pat. Nos. 3,503,924 and 3,507,827).

The preferred mercaptan-containing organic compounds useful in this invention are those compounds according to formula (VI) where $R^{14}$ is —H, $R^{24}$ is —H, $R^{15}$ is

and i=1; those compounds according to formula (VII) where $R^{10}$ is phenyl, $R^{14}$ is —H, $R^{23}$ is —H, $R^{19}$ is —H; i=1 and j=1; those compunds according to formula (VIII) where $R^{14}$ is —H, $R^{17}$ is

and i=1; those compounds according to formula (IX) where $R^{14}$ is —H and i=1; those compounds according to formula (X) where $R^{20}$ is —$C_2H_5$ or

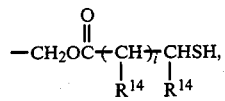

$R^{14}$ is —H and i=1; and those compounds according to formula (XI) where $R^{14}$ is —H and i=1; and those compounds according to formula (XIa) where $R^{200}$ is —$CH_2CH_2$— or

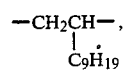

and $R^{201}$ is —$CH_2$— or

Of the foregoing, the mercaptan-containing organic compounds according to formula (VI) are more preferred.

Examples of the mercaptan-containing organic compounds described by formula (VI) include, but are not limited to, the following compounds:

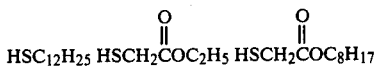

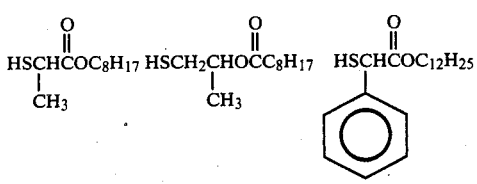

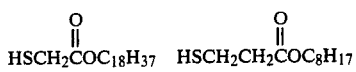

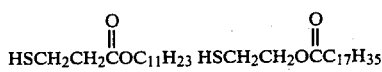

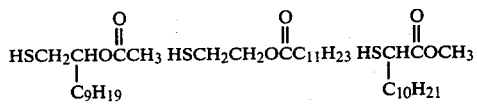

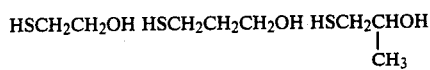

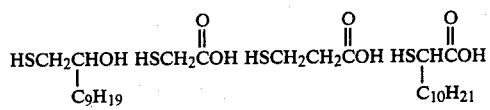

Examples of the mercaptan-containing organic compounds described by formula (VII) include, but are not limited to, the following compounds:

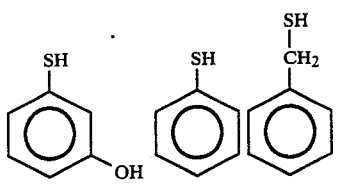

Examples of mercaptan-containing organic compounds represented by formula (VIII) include, but are not limited to, the following compounds:

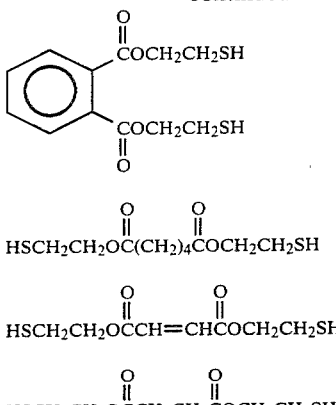

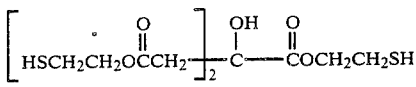

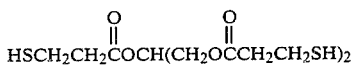

An example of the mercaptan-containing organic compounds described by formula (IX) includes, but is not limited to, the following:

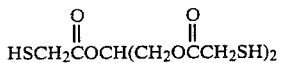

The mercaptan-containing organic compounds represented by formula (X) are exemplified by, but are not limited to, the following:

The mercaptan-containing organic compounds represented by formula (XI) are exemplified by, but are not limited to, the following:

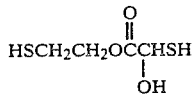

The mercaptan-containing organic compounds represented by formula (XIa) are exemplified by, but are not limited to, the following:

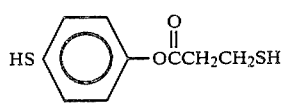

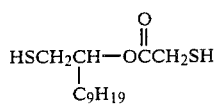

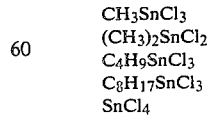

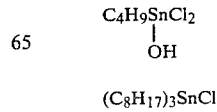

The halogen-containing tin compounds useful in this invention contain a tetravalent tin atom having bonded directly thereto at least one halogen atom, and are selected from compounds having the formula:

$$R_{(g)}^{11}-Sn-Q_{(h)}$$
$$\underset{R_{(r)}^{22}}{|}$$
(XII)

where
Q is Cl, Br, or I;
$R^{11}$ and $R^{22}$ are the same or different and are selected from $-R$, $-R^1$,

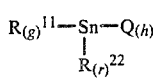

$-R^9-O-R^{12}$,

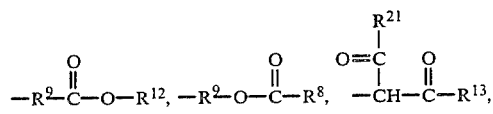

$-R^9-CN$,

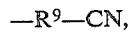

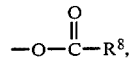

$-O-R^{12}$ where R, $R^1$, $R^8$, $R^9$, $R^{12}$, $R^{13}$ and $R^{21}$ are as previously defined; and
$g=0$, 1, 2 or 3, $r=0$, 1, 2, or 3 and $h=1$, 2, 3 or 4 with the proviso that $g+r+h=4$.

The preferred halogen-containing tin compounds useful in this invention are those compounds according to formula (XII) where $R^{11}$ is methyl, $R^{22}$ is $-Cl$, Q is Cl, $g=1$, $h=2$ and $r=1$.

Examples of halogen-containing tin compounds which are useful in this invention include, but are not limited to, the compounds illustrated below.

$CH_3SnCl_3$
$(CH_3)_2SnCl_2$
$C_4H_9SnCl_3$
$C_8H_{17}SnCl_3$
$SnCl_4$ $C_4H_9SnCl_2$
$\quad |$
$\quad OH$ $(C_8H_{17})_3SnCl$

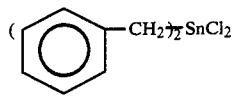

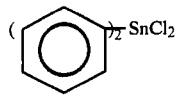

CH₃SnBr₃

CH₃SnI₃

(C₄H₉)₂SnCl₂

$$(CH_3CH_2\overset{O}{\underset{\|}{C}}CH_2CH_2)_2SnCl_2$$

$$\underset{\underset{CH_3}{|}}{C_7H_{15}\overset{O}{\underset{\|}{C}}OSnCl_2}$$

(C₁₂H₂₅)₂SnBr₂
(NCCH₂CH₂)₂SnCl₂

$$(CH_3\overset{O}{\underset{\|}{C}})_2CHSnCl_3$$

(HOCH₂CH₂CH₂)₂SnCl₂

$$(C_{17}H_{33}\overset{O}{\underset{\|}{C}}O)_2SnCl_2$$

$$\underset{\underset{Cl}{|}}{(CH_3)_2SnOC_4H_9}$$

The halogen-containing tin compounds useful in this invention are conveniently prepared by methods well known in the art. For example, methods for preparing these halogen-containing tin compounds are disclosed in U.S. Pat. Nos. 3,745,183, 3,857,868 and 4,134,878.

It should be noted that, in an effort to simplify the foregoing formulas I-XII and render them as clear and concise as possible, some letters are used more than once in the same formula and/or in more than one formula. Thus, for example, R¹ appears twice in formula IV and also in formulas II, IIa, III, V and XII. It is intended that, in those instances where the same letter is used either more than once in the same formula or in more than one formula, that letter represents at each independent occurence any group contained in the set of groups encompassed by its definition, or any and all subsets thereof. It is further intended that any modification or limitation in the definition of a particular letter at one occurence does not necessarilly affect its definition at any other occurence. For example, should the definition of X in formula II be limited from —SR², Cl, Br, I, $$-O\overset{O}{\underset{\|}{C}}R^8$$

or —OR⁸ to Cl, Br or I, then X in each of formulas III, IV and V may still represent at each independent occurence the set of groups consisting of —SR², Cl, Br, I, $$-O\overset{O}{\underset{\|}{C}}R^8$$

and —OR⁸, or any and all subsets thereof such as, for example, —SR², $$-O\overset{O}{\underset{\|}{C}}R^8$$

and —OR⁸, or Cl, Br, I and —OR⁸.

In one embodiment, the stabilizer compositions of this invention comprise (A) an organotin compound or mixture of organotin compounds selected from organotin compounds according to formulas (I), (II), (IIa), (III), (IV) and/or (V) (B) a mercaptan-containing organic compound or mixture of mercaptan-containing organic compounds selected from compounds according to formulas (VI), (VII), (VIII), (IX), (X), (XI) and/or (XIa); and, optionally, (C) a halogen-containing tin compound or mixture of halogen-containing tin compounds selected from compounds according to formula (XII), with the proviso that when no halogen-containing tin compound according to formula XII is employed, then at least one of the organotin compounds of component A is selected from compounds according to formulas (II), (III), (IV) or (V) wherein at least one X or X¹ is Cl, Br, or I.

In another embodiment, the stabilizer compositions of this invention comprise (A) organotin compounds comprising an organotin compound or mixture of organotin compounds according to formula (IIa) either alone or in admixture with any or all the organotin compounds according to formulas (I), (II), (III), (IV) and/or (V); (B) a mercaptan-containing organic compound or mixture of mercaptan-containing organic compounds according to formulas (VI), (VII), (VIII), (IX), (X) and (XI); and (C) a halogen-containing tin compound or mixture of halogen-containing tin compounds according to formula XII and/or according to formulas (II), (III), (IV) and (V) where at least one X or X¹ is Cl, Br or I.

In a further embodiment, the stabilizer compositions of this invention comprise (A) an organotin compound or mixture of organotin compounds according to formulas (I), (II), (IIa), (III), (IV) and/or (V); (B) a mercaptan-containing organic compound or mixture of mercaptan-containing organic compounds according to formula (XIa) either alone or in admixture with the mercaptan-containing organic compounds according to formulas (VI), (VII), (VIII), (IX), (X) and/or (XI); and, optionally, (C) a halogen-containing tin compound or mixture of halogen-containing tin compounds according to formula XII, with the proviso that when no halogen-containing tin compound according to formula XII is employed, then at least one of the organotin compounds of component a is selected from compounds according to formulas (II), (III), (IV) or (V) wherein at least one X or X¹ is Cl, Br or I.

The stabilizer compositions of this invention may be prepared by blending the components thereof in any convenient manner which produces a homogeneous mixture, such as by shaking or stirring in a container. Likewise, the stabilizer compositions of this invention can be incorporated into the halogen-containing organic polymer by admixing the stabilizer composition and polymer, such as, for example, in an appropriate mill or mixer or by any other of the well-known methods which provide uniform distribution of the stabilizer throughout the polymer.

As previously stated, the stabilizer compositions of the present invention comprise an organotin compound or mixture of organotin compounds, a mercaptan-containing organic compound or mixture of mercaptan-containing organic compounds, and, optionally, a halogen-containing tin compound or mixture of halogen-containing compounds. It should be emphasized that all of the stabilizer compositions of this invention contain a weight percent of halogen, based on the total weight of the stabilizer composition, of about 0.1% to about 10%, preferably about 0.5% to about 2%. A weight percent of halogen of about 0.1% has been found to be effective in providing the stabilizers of the invention with improved performance, while weight percents of halogen in excess of 10% tend to decrease the effectiveness of the stabilizer compositions. This required weight percent of halogen may come from the halogen-containing tin compounds alone; from a combination of the halogen-containing tin compounds and organotin compounds according to formulas (II), (III), (IV) and (V) wherein at least one X or $X^1$ is Cl, Br or I; or solely from orgaotin compounds according to formulas (II), (III), (IV) and (V) wherein at least one X or $X^1$ is Cl, Br or I. For example, when no halogen-containing tin compound according to formula (XII) is present in the stabilizer composition, i.e. when the weight percent of halogen-containing tin compound is 0, then the organotin compound is selected from those represented by formulas (II), (III), (IV) and (V) wherein at least one X or $X^1$ is Cl, Br or I, and said organotin compound or mixture of said organotin compounds is employed in an amount sufficient to provide the required weight percent of halogen.

The stabilizer compositions of this invention contain about 10% to about 60%, preferably about 20% to about 40% by weight based on the total weight of the stabilizer composition of mercaptan-containing organic compound or mixtures of mercaptan-containing organic compounds. The remainder of the stabilizer composition is comprised of organotin compound or mixture of organotin compounds, and, optionally, halogen-containing tin compound or mixture of halogen-containing tin compounds, said compounds being selected to provide the required weight percent of halogen in the stabilizer composition. While the precise amount of organotin compounds and optional halogen-containing tin compounds employed in the stabilizer compositions of this invention will be determined by the halogen content of the particular compounds utilized, in general the stabilizer compositions of this invention contain about 40% to about 90%, preferably about 50% to about 70% organotin compound or mixture of organotin compounds, and 0% to about 33%, preferably about 0.1% to about 15% halogen-containing tin compound or mixture of halogen-containing tin compounds, all percentages being by weight based on the total weight of the stabilizer composition.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.40 parts by weight of the stabilizer composition per hundred parts by weight of halogen-containing organic polymer will be stablizingly effective. While there is no critical upper limit to the amount of stabilizer composition which can be employed, amounts in excess of about 10 parts by weight of stabilizer composition per hundred parts by weight of halogen-containing organic polymer do not give an increase in effectiveness commensurate with the additional amount of stabilizer employed.

The stabilized halogen-containing organic polymer compositions of this invention may be used form articles of manufacture, e.g. pipe. A variety of conventional molding techniques may be employed to form the stabilized compositions into any desired shape.

The following examples illustrate this invention. Unless otherwise indicated, all parts and percentages in the examples and throughout this specification are by weight.

EXAMPLES 1–6

Several mixtures are prepared by dry blending to 110° C. in a Henschel high intensity mixer (Model 2JSS) 100.0 parts of polyvinyl chloride (Geon 103EP-F-76 available commercially from B. F. Goodrich Chemical Company) with 3.0 parts of fine particle size calcium carbonate coated with calcium stearate, 1.0 part titanium dioxide, 1.2 parts paraffin wax (ADVAWAX® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight of stabilizer per hundred parts polyvinyl chloride. The resulting mixture is masticated on a two-roll mill at about 193° C. Samples are taken at one minute intervals beginning after the first introduction of the mix to the mill.

The appearance of each sample taken from the mill is evaluated using the following scale:

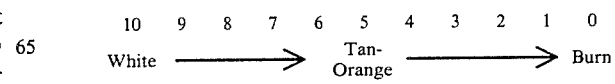

The results of these tests are indicated in Table A.

TABLE A

| Example No. | Stabilizer Composition | Parts By Weight | 1 | 2 | 3 | 4 | 5 | 6 | 7 | 8 | 9 | 10 |
|---|---|---|---|---|---|---|---|---|---|---|---|---|
| | | | | | | | COLOR | | | | | |
| 1 | Organotin Cmpd. No. 3 from Table I | 0.40 | 10+ | 10 | 10 | 9 | 7 | 6 | 4 | 2 | 1 | 0 |
| | $HSCH_2CH_2\overset{O}{\overset{\|}{C}}OC_8H_{17}$ | 0.08 | | | | | | | | | | |
| 2a | $CH_3SnCl_3$<br>Organotin Cmpd. No. 9 from Table II | 0.01<br>0.40 | 10+ | 10+ | 10 | 9 | 8 | 6 | 4 | 2 | 1 | 0 |
| | $HSCH_2CH_2O\overset{O}{\overset{\|}{C}}C_{17}H_{33}$ | 0.20 | | | | | | | | | | |
| 2b | $SnCl_4$<br>Organotin Cmpd. No. 9 from Table II | 0.001<br>0.40 | 10+ | 10+ | 10 | 9 | 8 | 6 | 4 | 3 | 2 | 0 |
| | $C(CH_2O\overset{O}{\overset{\|}{C}}CH_2SH)_4$ | 0.10 | | | | | | | | | | |
| 3 | $(CH_3)_2SnCl_2$<br>Organotin Cmpd. No. 12 from Table III | 0.10<br>0.35 | 10+ | 10+ | 10+ | 10 | 9 | 8 | 5 | 3 | 1 | 0 |
| | $HSCH_2CH_2O\overset{O}{\overset{\|}{C}}C_{17}H_{35}$ | 0.10 | | | | | | | | | | |
| | $(C_6H_5)_2SnCl_2$ | 0.03 | | | | | | | | | | |
| 4a | Organotin Cmpd. No. 16 from Table III | 0.50 | 10+ | 10+ | 10+ | 10+ | 9 | 7 | 5 | 2 | 1 | 0 |
| | $HSCH_2O\overset{O}{\overset{\|}{C}}(CH_2)_4\overset{O}{\overset{\|}{C}}OCH_2SH$ | 0.30 | | | | | | | | | | |
| 4b | $(C_4H_9)SnCl_2$<br>Organotin Cmpd. No. 16 from Table III | 0.15<br>0.50 | 10+ | 10+ | 10+ | 10 | 8 | 7 | 4 | 3 | 1 | 0 |
| | $HSCH_2CH_2O\overset{O}{\overset{\|}{C}}(CH_2)_4\overset{O}{\overset{\|}{C}}OCH_2CH_2SH$ | 0.30 | | | | | | | | | | |
| | $(CH_3\overset{O}{\overset{\|}{C}})_2CHSnCl_3$ | 0.20 | | | | | | | | | | |
| 5a | Mixture of equal weight proportions of Organotin Cmpd. No. 1 from Table I and Organotin Cmpd. No. 11 from Table II | 0.30 | 10+ | 10 | 9 | 8 | 7 | 5 | 4 | 3 | 2 | 1 |
| | $HSCH_2CH_2CH_2O\overset{O}{\overset{\|}{C}}C_8H_{17}$ | 0.03 | | | | | | | | | | |
| 5b | $SnCl_4$<br>Mixture of equal weight proportions of Organotin Cmpd. No. 1 from Table I and Organotin Cmpd. No. 11 from Table II | 0.003<br>0.30 | 10+ | 10+ | 10 | 9 | 8 | 5 | 3 | 2 | 1 | 0 |
| | $HSCH_2CH_2CH_2O\overset{O}{\overset{\|}{C}}C_8H_{17}$ | 0.03 | | | | | | | | | | |
| 5c | $(CH_3)_2SnCl_2$<br>Mixture of equal weight proportions of Organotin Cmpd. No. 1 from Table I and Organotin Cmpd. No. 11 from Table II | 0.10<br>0.30 | 10+ | 10+ | 10 | 9 | 8 | 6 | 4 | 2 | 1 | 0 |
| | $HSCH_2\overset{O}{\overset{\|}{C}}OC_8H_{17}$ | 0.10 | | | | | | | | | | |
| 6 | $(CH_3)_2SnBr_2$<br>Mixture of equal weight proportions of Organotin Cmpd. No. 19 from Table III and Organotin Cmpd. No. 2 from | 0.05<br>0.20 | 10+ | 10+ | 10 | 8 | 7 | 5 | 4 | 2 | 2 | 0 |

(Note: one row shows a structure with benzene ring bearing $SnCl_2$ substituents: $(C_6H_5)_2SnCl_2$ depicted as bis(phenyl)tin dichloride)

TABLE A-continued

| Example No. | Stabilizer Composition | Parts By Weight | Minutes of Milling 1 2 3 4 5 6 7 8 9 10 COLOR |
|---|---|---|---|
| | Table I | | |
| | $\underset{\text{HSCH}_2\text{CH}_2\text{OCCH}_3}{\overset{\overset{\text{O}}{\|}}{}}$ | 0.20 | |
| | $\underset{\underset{\text{Cl}}{\|}}{(\text{CH}_3)_2\text{SnOC}_4\text{H}_9}$ | 0.01 | |

EXAMPLES 7–26

The stabilizer compositions indicated in Table B below are tested in the same manner and with substantially equivalent results as the stabilizer compositions of Examples 1–6.

TABLE B

| Example No. | Stabilizer Composition | Parts By Weight |
|---|---|---|
| 7 | Organotin Cmpd No. 5 from Table I | 0.40 |
| | $\underset{\text{HSCH}_2\text{CH}_2\text{COC}_8\text{H}_{17}}{\overset{\overset{\text{O}}{\|}}{}}$ | 0.15 |
| 8 | CH$_3$SnBr$_3$ | 0.05 |
| | Organotin Cmpd No. 9 from Table II | 0.40 |
| | $\underset{\text{HSCH}_2\text{CH}_2\text{OCC}_{17}\text{H}_{33}}{\overset{\overset{\text{O}}{\|}}{}}$ | 0.20 |
| 9 | C$_8$H$_{17}$SnCl$_3$ | 0.05 |
| | Organotin Cmpd No. 9 from Table II | 0.40 |
| | $(\text{HSCH}_2\text{CH}_2\text{OCCH}_2)_{\overline{2}}\underset{\underset{\text{OH}}{\|}}{\text{C}}-\overset{\overset{\text{O}}{\|}}{\text{C}}\text{OCH}_2\text{CH}_2\text{SH}$ | 0.40 |
| 10 | (C$_8$H$_{17}$)$_3$SnCl | 0.05 |
| | Organotin Cmpd No. 12 from Table III | 0.35 |
| | $\underset{\text{HSCH}_2\text{CH}_2\text{OCC}_{17}\text{H}_{35}}{\overset{\overset{\text{O}}{\|}}{}}$ | 0.10 |
| | $(\underset{}{\bigcirc}-\text{CH}_2)_{\overline{2}}\text{SnCl}_2$ | 0.10 |
| 11a | Organotin Cmpd No. 18 from Table III | 0.40 |
| | $\underset{\underset{\text{CH}_3}{\|}}{\text{HSCH}_2\text{CHOCC}_8\text{H}_{17}}\overset{\overset{\text{O}}{\|}}{}$ | 0.60 |
| 11b | (C$_{12}$H$_{25}$)$_2$SnBr$_2$ | 0.10 |
| | Organotin Cmpd No. 18 from Table III | 0.40 |
| | $\underset{\underset{\text{CH}_3}{\|}}{\text{HSCH}_2\text{CHOCC}_8\text{H}_{17}}\overset{\overset{\text{O}}{\|}}{}$ | 0.60 |
| | $(\text{C}_4\text{H}_9\text{OCCH}_2\text{CH}_2)_2\text{SnCl}_2 \overset{\overset{\text{O}}{\|}}{}$ | 0.005 |

TABLE B-continued

| Example No. | Stabilizer Composition | Parts By Weight |
|---|---|---|
| 11c | Organotin Cmpd No. 18 from Table III | 0.40 |
| | $\text{HSCH}_2\text{CH}_2\text{OCCH}\overset{\overset{\text{O}}{\|}}{=}\text{CHCOCH}_2\text{CH}_2\text{SH}\overset{\overset{\text{O}}{\|}}{}$ | 0.10 |
| 11d | (HOCH$_2$CH$_2$)$_2$SnCl$_2$ | 0.10 |
| | Organotin Cmpd No. 18 from Table III | 0.40 |
| | $\text{HSCH}_2\text{CH}_2\text{OCCH}\overset{\overset{\text{O}}{\|}}{=}\text{CHCOCH}_2\text{CH}_2\text{SH}\overset{\overset{\text{O}}{\|}}{}$ | 0.10 |
| 12 | (NCCH$_2$CH$_2$)$_2$SnCl$_2$ | 0.10 |
| | Mixture of equal weight proportions of Organotin Cmpd No. 1 from Table I and Organotin Cmpd No. 11 from Table II | 0.30 |
| | $\underset{\text{HSCH}_2\text{CH}_2\text{OCCH}_3}{\overset{\overset{\text{O}}{\|}}{}}$ | 0.05 |
| 13a | CH$_3$SnCl$_3$ | 0.10 |
| | Mixture of equal weight proportions of Organotin Cmpd No. 19 from Table III and Organotin Cmpd No. 2 from Table I | 0.20 |
| | $\underset{\text{HSCH}_2\text{CH}_2\text{OCCH}_3}{\overset{\overset{\text{O}}{\|}}{}}$ | 0.20 |
| | $(\bigcirc)_{\overline{2}}\text{SnCl}_2$ | 0.005 |
| 13b | Mixture of equal weight proportions of Organotin Cmpd No. 19 from Table III and Organotin Cmpd No. 2 from Table I | 0.20 |
| | $\underset{\text{HSCH}_2\text{CH}_2\text{OCCH}_3}{\overset{\overset{\text{O}}{\|}}{}}$ | 0.20 |
| 13c | SnCl$_4$ | 0.20 |
| | Mixture of equal weight proportions of Organotin Cmpd No. 19 from Table III and Organotin Cmpd No. 2 from Table I | 0.20 |
| | $\underset{\text{HSCH}_2\text{CH}_2\text{OCCH}_3}{\overset{\overset{\text{O}}{\|}}{}}$ | 0.20 |
| | $\underset{\underset{\text{Cl}}{\|}}{(\text{CH}_3)_2\text{SnOC}_4\text{H}_9}$ | 0.01 |
| 13d | Mixture of equal weight proportions of Organotin Cmpd No. 19 from Table III and Organotin Cmpd No. 2 from Table I | 0.20 |

TABLE B-continued

| Example No. | Stabilizer Composition | Parts By Weight |
|---|---|---|
| | HSCH$_2$CH$_2$OCCH$_3$ (with C=O) | 0.20 |
| | CH$_3$Sn(SCH$_2$CH$_2$OCC$_{11}$H$_{23}$)$_2$Cl (with C=O) | 0.05 |
| 13e | Mixture of equal weight proportions of Organotin Cmpd No. 19 from Table III and Organotin Cmpd No. 2 from Table I | 0.20 |
| | HSCH$_2$CH$_2$OH | 0.20 |
| | CH$_3$Sn(SCH$_2$COC$_8$H$_{17}$)$_2$Cl (with C=O) | 0.08 |
| 13f | Mixture of equal weight proportions of Organotin Cmpd No. 19 from Table III and Organotin Cmpd No. 2 from Table I | 0.20 |
| | HSCH$_2$COOH | 0.10 |
| | CH$_3$Sn(SCH$_2$COC$_8$H$_{17}$)$_2$Cl (with C=O) | 0.08 |
| 13g | Mixture of equal weight proportions of Organotin Cmpd No. 19 from Table III and Organotin Cmpd No. 2 from Table I | 0.20 |
| | HSCH$_2$CH$_2$OCCH$_3$ (with C=O) | 0.20 |
| | Cl$_2$Sn(OCC$_{17}$H$_{33}$)$_2$ (with C=O) | 0.10 |
| 14 | Organotin Cmpd No. 20 from Table III | 0.25 |
| | HSCH$_2$COCH(CH$_2$OCCH$_2$SH)$_2$ (with C=O's) | 0.10 |
| | CH$_3$SnCl$_3$ | 0.02 |
| 15 | Mixture of equal weight proportions of Organotin Cmpd No. 6 from Table 6 and Organotin Cmpd No. 11 from Table II | 0.30 |
| | HSCH$_2$CH$_2$OCC$_{17}$H$_{33}$ (with C=O) | 0.17 |
| | C$_8$H$_{17}$SnCl$_3$ | 0.05 |
| 16 | 1:2 weight ratio mixture of Organotin Cmpd No. 7 from Table I and Organotin Cmpd No. 19 from Table III | 0.40 |
| | HSCH$_2$COC$_8$H$_{17}$ (with C=O) | 0.10 |
| | (CH$_3$)$_2$SnCl$_2$ | 0.04 |
| 17 | Organotin Cmpd No. 21 from Table III | 0.30 |
| | HSCH$_2$CH$_2$OCC$_{17}$H$_{33}$ (with C=O) | 0.08 |
| | CH$_3$SnCl$_3$ | 0.03 |
| 18 | Organotin Cmpd No. 18 from Table III | 0.40 |
| | HSCH$_2$CH$_2$OCCH=CHCOCH$_2$CH$_2$SH (with C=O's) | 0.10 |
| 19 | Organotin Cmpd No. 18 from Table III | 0.40 |
| | HSCH$_2$CHOCC$_8$H$_{17}$ with CH$_3$ branch (with C=O) | 0.60 |
| 20 | Organotin cmpd. No. 7a from Table Ia | 0.325 |
| | HSC$_{12}$H$_{25}$ | 0.075 |
| | CH$_3$SnCl$_3$ | 0.025 |
| 21 | Organotin cmpd. No. 7d from Table Ia | 0.45 |
| | HSCH$_2$—C$_6$H$_5$ | 0.10 |
| | SnCl$_4$ | 0.01 |
| 22 | Organotin cmpd. No. 8 from Table II | 0.275 |
| | HSCH$_2$CH$_2$OCCH$_2$SH (with C=O) | 0.10 |
| | (CH$_3$)$_2$SnCl$_2$ | 0.05 |
| 23 | Organotin cmpd. No. 18 from Table III | 0.225 |
| | HSCH$_2$CH$_2$OCCHSH with OH branch (with C=O) | 0.125 |
| 24 | Organotin cmpd. No. 7h from Table Ia | 0.15 |
| | C$_8$H$_{17}$—Sn(=S)—S—Sn(=S)—C$_8$H$_{17}$ | 0.15 |
| | HSCH$_2$COC$_8$H$_{17}$ (with C=O) | 0.10 |
| | C$_4$H$_9$SnCl$_3$ | 0.03 |
| 25 | Organotin cmpd. No. 7i from Table Ia | 0.15 |
| | Organotin cmpd. No. 11 from Table II | 0.20 |
| | HSCH$_2$CHCH$_2$OCCH$_2$SH with OCCH$_3$ branch (with C=O's) | 0.15 |
| | (H$_9$C$_4$OCCH$_2$CH$_2$)$_2$SnCl$_2$ (with C=O) | 0.05 |
| 26 | Organotin cmpd. No. 7e from Table Ia | 0.25 |
| | C$_4$H$_9$—Sn(SCH$_2$CH$_2$OCC$_{17}$H$_{33}$)$_2$Cl (with C=O) | 0.20 |
| | HSCH$_2$CH$_2$OCCH$_2$SH (with C=O) | 0.20 |

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What we claim and desire to protect by Letters Patent is:

1. A composition for stabilizing halogen-containing polymers against the deteriorative effects of heat comprising the product obtained by blending.

A. about 40% to about 90% of an organotin compound or mixture of organotin compounds having one or more tetravalent tin atoms which each have at least one direct tin to carbon bond selected from compounds having the formulas:

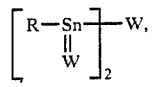 (I)

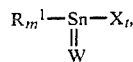 (II)

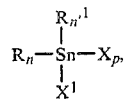 (III)

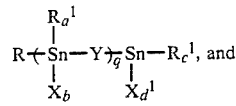 (IV)

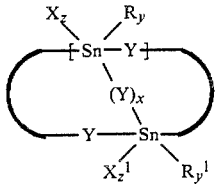 (V)

wherein
X and $X^1$ are the same or different and are selected from $-SR^2$, Cl, Br, I,

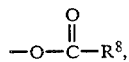

and $O-R^8$ with the proviso that in formula (II) when $t=1$, in formula (V) when $z=1$ and in formulas (III) and (IV) at least one X or $X^1$ is $-SR^2$;
Y is $-(S)_v-$, $-W-R^3-W^1-$,

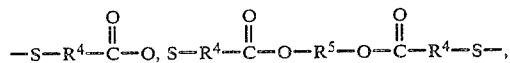

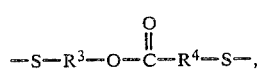

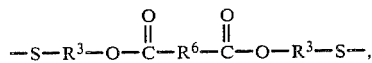

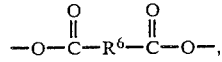

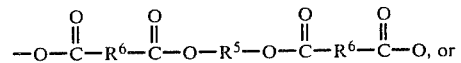

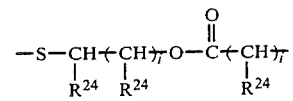

W and $W^1$ are the same or different and are oxygen or sulfur;
R and $R^1$ are the same or different and are selected from alkyl, aryl, alkenyl, aralkyl, alkaryl, cycloalkyl, cycloalkenyl,

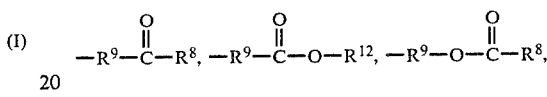

$-R^9-O-R^{12}$, and $-R^9-CN$;
$R^2$ is alkyl, alkenyl, aryl, aralkyl, cycloalkyl, cycloalkenyl,

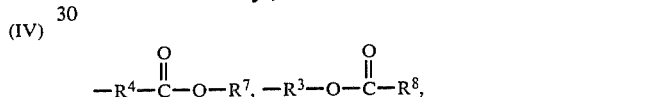

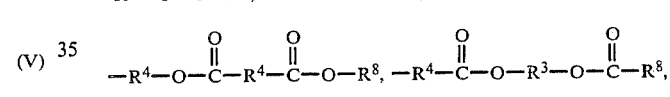

$-R^3-S-R^7$, or $-R^3-O-R^8$;
$R^3$ is alkylene of at least 2 carbon atoms, arylene, alkenylene of at least 2 carbon atoms, cycloalkylene, or cycloalkenylene;
$R^4$ is alkylene, arylene, alkenylene of at least 2 carbon atoms, cycloalkylene, or cycloalkenylene;
$R^5$ is $R^3$;
$R^6$ is nothing or $R^4$;
$R^7$ is $-H$ or $R^8$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is $-H$ or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;
$R^{24}$ is

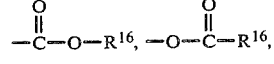

$-OH$, $-SH$, aryl, $C_1$ to $C_{18}$ alkyl or $-H$;
$R^{16}$ is $-H$ or $R^8$;
$i=0$ or an integer from 1 to 6 inclusive;
$m=1$ or 2 and $t=0$ or 1 with the proviso that $m+t=2$;
$n=0$, 1 or 2, $n'=0$, 1 or 2 and $p=1$ or 2 with the proviso that $n+n'=1$ or 2 and $n+n'+p=3$;

a=0, 1 or 2, b=0, 1 or 2, q=an integer from 1 to 5 inclusive, c=1, 2 or 3 and d=0, 1 or 2 with the proviso that a+b=2 and c+d=3;

v=an integer from 1 to 8 inclusive; and w=0, 1 or 2, x=0 or 1, y=1 or 2, z=0 or 1 with the proviso that when x=0 and w=1 or 2 then y=1 and z=1, when x=1 then y=1, z=0 and w=1, when w=2 then x=0, y=1 and z=1 and when w=0 then x=0, y=1, z=1 and Y is —W—R$^3$—W$^1$— or $$-S-R^4-\overset{O}{\underset{\|}{C}}-O;$$

B. about 10% to about 60% of a mercaptan-containing organic compound or mixture of mercaptan-containing organic compounds having the formula selected from:

$$HSR^{200}-O-\overset{O}{\underset{\|}{C}}-R^{201}-SH \qquad (XIa)$$

where

R$^{200}$ and R$^{201}$ are the same or different and are alkylene, alkenylene, arylene, cycloalkylene or cycloalkenylene; or alkylene, alkenylene, arylene, cycloalkylene or cycloalkenylene each substituted with one or two —R, —OR$^7$, —R$^4$—OR$^7$, $$-O\overset{O}{\underset{\|}{C}}R^8 \text{ or } -O\overset{}{\underset{\underset{O}{\|}}{C}}-R^4-\overset{}{\underset{\underset{O}{\|}}{C}}-OR^8$$

groups;

R, R$^4$, R$^7$ and R$^8$ are as previously defined; and

C. 0% to about 33% of a halogen-containing tin compound or mixture of halogen-containing tin compounds wherein the tin atom is tetravalent and has at least one halogen atom bonded directly to it, said halogen-containing tin compound selected from compounds having the formula:

$$R_{(g)}^{11}-\underset{\underset{R_{(r)}^{22}}{|}}{Sn}-Q_{(h)} \qquad (XII)$$

where

Q is Cl, Br, or I;

R$^{11}$ and R$^{22}$ are the same or different and are selected from —R, —R$^1$, $$-R^9-\overset{O}{\underset{\|}{C}}-R^8,$$

$$-R^9-O-R^{12},$$

$$-R^9-\overset{O}{\underset{\|}{C}}-O-R^{12}, -R^9-O-\overset{O}{\underset{\|}{C}}-R^8, -\overset{R^{21}}{\underset{|}{CH}}-\overset{O=C}{\underset{\underset{O}{\|}}{\overset{|}{\phantom{C}}}}-R^{13},$$

$$-R^9-CN,$$

$$-O-\overset{O}{\underset{\|}{C}}-R^8,$$

—O—R$^{12}$ where R, R$^1$, R$^8$, R$^9$, R$^{12}$, R$^{13}$ and R$^{21}$ are as previously defined; and g=0, 1, 2 or 3, r=0, 1, 2, or 3 and h=1, 2, 3 or 4 with the proviso that g+r+h=4, all percentages being by weight based on the total weight of the stabilizer composition, with the proviso that when the weight percent of the halogen-containing tin compound is 0, then at least one of the organotin compounds of component A is selected from compounds having formulas (II), (III), (IV) or (V) wherein at least one X or X$^1$ is Cl, Br or I.

2. A composition according to claim 1 wherein in formula (XIa) R$^{200}$ is —CH$_2$CH$_2$— or $$-\underset{\underset{C_9H_{19}}{|}}{CH_2CH}-$$

and R$^{201}$ is —CH$_2$ or $$-\underset{\underset{OH}{|}}{CH}-.$$

3. A polymer composition stabilized against the deteriorative effects of heat comprising a halogen-containing organic polymer and a stabilizing amount of the composition of claim 1.

* * * * *

UNITED STATES PATENT AND TRADEMARK OFFICE
CERTIFICATE OF CORRECTION

PATENT NO. : 4,665,114
DATED : May 12, 1987
INVENTOR(S) : Thomas G. Kugele; Keith A. Mesch; and Karl R. Wursthorn It is certified that error appears in the above-identified patent and that said Letters Patent is hereby corrected as shown below:

Column 3, lines 25-30, formula (V) should read:

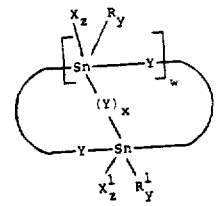

Column 11, line 65, formula (X) should read:

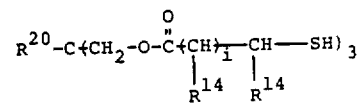

UNITED STATES PATENT AND TRADEMARK OFFICE
CERTIFICATE OF CORRECTION

PATENT NO.   : 4,665,114                           Page 2 of 2
DATED        : May 12, 1987
INVENTOR(S)  : Thomas G. Kugele; Keith A. Mesch; and Karl R. Wursthorn It is certified that error appears in the above-identified patent and that said Letters Patent is hereby corrected as shown below:

Column 25, Example 15 in Table B, "Table 6" should be --Table I--.
Column 27, Claim 1, formula (V) should read:

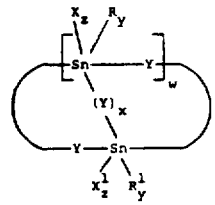

Signed and Sealed this

Eighteenth Day of February, 1992

Attest:

HARRY F. MANBECK, JR.

*Attesting Officer*   *Commissioner of Patents and Trademarks*